UNITED STATES PATENT OFFICE.

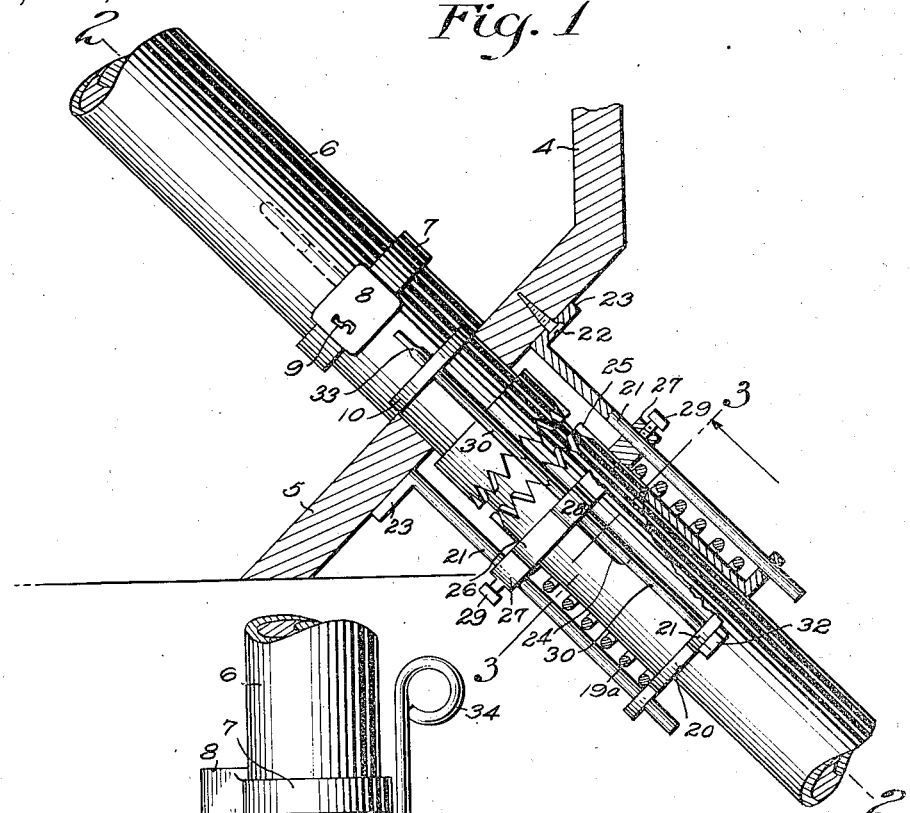

GRANT RISDON, OF JERSEY CITY, NEW JERSEY.

AUTOMOBILE-LOCK.

1,170,335.   Specification of Letters Patent.   Patented Feb. 1, 1916.

Application filed June 17, 1915.   Serial No. 34,619.

*To all whom it may concern:*

Be it known that I, GRANT RISDON, a citizen of the United States, and a resident of Jersey City, in the county of Hudson and State of New Jersey, have invented a new and Improved Automobile-Lock, of which the following is a full, clear, and exact description.

My invention relates to locks suitable for use upon automobiles and other vehicles, and used for the purpose of enabling the operator to leave the vehicle in such condition that it cannot be made to travel except when unlocked.

More particuarly stated, I seek to provide a locking mechanism of special construction, to be used in connection with the steering post in order to prevent the latter from being turned.

Reference is made to the accompanying drawings forming part of this specification, in which like characters of reference indicate corresponding parts in all the figures.

Figure 1 is a side view partly in section and partly broken away, showing my improved mechanism as applied to the steering post of an automobile. Fig. 2 is a section on the line 2—2 of Fig. 1. Fig. 3 is a section on the line 3—3 of Fig. 1 looking in the direction of the arrow.

The dashboard is shown at 4 and the footboard, which is practically a continuation of the dashboard, appears at 5. The steering column is shown at 6 and is of the usual tubular formation, being mounted rigidly upon the footboard 5 and projecting backwardly and upwardly from the same. Mounted rigidly upon the steering column 6 is a collar 7 which carries a lock 8, this lock being provided with a keyhole 9. Integral with the steering column 6 and extending laterally from the same are two lugs 10—11 provided with holes 12—13, these holes registering with other holes 14—15 extending through the footboard 5. The steering post appears at 16 and is generally in the form of a tubular shaft. Mounted rigidly upon the steering post 16 is a collar 17 provided with teeth 18, these parts forming a clutch member.

Loosely encircling the steering post 16 is a sleeve 19 provided at its lower end with a flange 20 of annular formation. A pair of guide rods 21 (see Fig. 1) are each secured in position by a screw 22 or other appropriate fastening and to thus facilitate this purpose is provided with a foot 23 through which the screw or other fastening extends in order to secure the foot upon the footboard 5. The guide rods 21 extend through holes in the flange 20. The sleeve 19 is provided with a pair of oppositely disposed slots 24 and is further provided with a number of clutch teeth 25 mating the teeth 18. Encircling the sleeve 19 is a ring 26 which is provided with eyes 27—28. Extending into the eyes 27 are set screws 29 which engage the guide rods 21 and hold the ring 26 rigid relatively to the same. Loosely extending through the eyes 28 are two rods 30—31 which also extend through holes in the flange 20. The lower ends of these rods are provided with nuts 32 and are soldered or brazed to the flange 20. The upper end of the rod 30 is provided with an eye 33 which is, to all intents and purposes, a part of the lock 8, that is to say, the lock 8 holds the eye 33 or releases it, depending upon the condition of the lock as controlled by the key.

The rod 31, which at its lower end is secured to the flange 20, extends through one of the eyes 28 carried by the ring 26 and also extends through the holes 13 and 15, and thus the holes virtually constitute one continuous opening. The upper end of the rod 31 is provided with an eye 34 serving the purpose of a handle. The operator by grasping this handle and moving the rod 31 in the general direction of its length can cause the sleeve 19 to slide back and forth relatively to the steering post 16. The ring 26 carries a pair of lugs 35 which extend into the adjacent slots 24. These lugs serve to limit the play of the sleeve 19 in its downward direction, and also serve to steady the ring 26 relatively to the sleeve 19 and rods 21. Since the rods 21, 30 and 31 extend through the lugs carried by the ring 26 and are secured to the flange 20, the rods are thus prevented from being twisted by any attempt at rotation upon the part of the sleeve 19.

The operation of my device is as follows: The parts being assembled and arranged as above described and as shown in the figures, the steering post 16 may be readily turned in either direction in the manner well known in this art. If now the operator grasps the eye 34 and by its aid pulls the rod 31 upwardly in the general direction of its length, the sleeve 19 travels upwardly so that the clutch teeth 25 carried by this sleeve engage the clutch teeth 18. The eye 33 at the same instant enters the lock 8 and is automatically secured therein, in the manner in which a hasp is secured in a lock as usually constructed. This done, the rod 31 cannot be pushed downwardly and as the steering post 16 cannot be rotated the vehicle cannot be steered or otherwise operated. In order to use the vehicle the operator inserts a key through the keyhole 9 and actuates the lock 8, thus releasing the eye 33. He then grasps the eye 34 and by pushing downwardly upon it causes the sleeve 19 to travel into its lowermost position, as indicated in Fig. 2. The clutch member 17 being now free to turn, the shaft 16 can be rotated in either of two directions and the vehicle steered accordingly.

I do not limit myself to the precise mechanism shown, as various changes may be made therein without departing from the spirit of the invention. Nor do I limit myself to any particular kind of vehicle upon which the apparatus may be used nor in all instances do I limit myself to the application of such an apparatus for use upon a vehicle.

What I claim is:—

1. In an automobile lock, the combination with a foot board having a steering column secured thereto, and a revoluble steering post extending through said steering column and said foot board, of a clutch member mounted rigidly upon the steering post, a sleeve provided with another clutch member and loosely encircling said steering post, guide members engaging the sleeve, for preventing rotation of the latter, means connected with the sleeve for sliding said sleeve upon said steering post in the general direction of the length thereof, and a locking mechanism including a member connected with the sleeve, and a lock mounted upon a fixed part and adapted to be engaged by said member to hold said sleeve in fixed position while said clutch members are in engagement.

2. The combination of a fixed steering column, a revoluble steering post extending through said steering column, a clutch member mounted rigidly upon said steering post and revoluble therewith, a sleeve loosely encircling said steering post, a second clutch member carried by said sleeve and adapted to engage and disengage said first mentioned clutch member when said sleeve is moved back and forth in the direction of the length of said steering post, fixed guide rods on which the sleeve is mounted for preventing said sleeve from turning with said steering post while permitting said sleeve to slide in the direction of the length of said steering post, a rod carried by said sleeve, and a lock mounted upon the steering column and provided with means for holding and releasing said rod.

3. A device of the character described, comprising a revoluble steering post, a ring mounted fixedly thereupon and provided with a surface for enabling said ring to serve as a clutch member, a sleeve loosely encircling said steering post and provided with a surface for enabling said sleeve to serve as a clutch member mating said first mentioned clutch member and adapted to engage and disengage the same, a flange carried by said sleeve, a spiral spring encircling said sleeve and engaging said flange, means for engaging said spiral spring in order to enable the same to be compressed by movement of said sleeve and said flange, means for shifting said sleeve bodily in the general direction of the length of said steering post, a locking mechanism controllable at the will of the operator for securing said sleeve in a position at one of the limits of its travel.

4. A device of the character described, comprising a footboard, a steering column mounted rigidly thereupon, a steering post extending through said steering column and said footboard and revoluble relatively to the same, a clutch member mounted rigidly upon said steering post, a second clutch member loosely encircling said steering post and adapted for engagement with and disengagement from said first mentioned clutch member, a flange carried by said second mentioned clutch member and provided with eyes, guide rods mounted rigidly upon said footboard and extending through some of said eyes of said flange in order to prevent rotation of said second mentioned clutch member, means for sliding said second mentioned clutch member in the general direction of the length of said steering post, a locking mechanism for holding said second mentioned clutch member in engagement with said first mentioned clutch member in order to prevent rotation of said steering post.

5. In an automobile lock, the combination with a fixed steering column, and a revoluble steering post extending through said steering column, of a clutch member mounted rigidly upon the steering post, a sleeve provided with another clutch member and loosely encircling said steering post, the said sleeve being provided with a pair of oppositely disposed slots, and having a flange at its lower end provided with openings, a ring encircling said sleeve and provided with eyes, fixed guide members extending through openings in the flange, and through corresponding eyes in said ring, the said ring being provided with lugs extending into the slots in said sleeve, means connected with said sleeve for sliding the same upon said steering post to engage and disengage the said clutch members, and locking mechanism for holding said sleeve in fixed position while said clutch members are in engagement.

In testimony whereof I have signed my name to this specification in the presence of two subscribing witnesses.

GRANT RISDON.

Witnesses:
 DOUGLAS CRAIG,
 DANIEL W. SITLER.